US 8,296,400 B2

(12) United States Patent
Gorthy et al.

(10) Patent No.: US 8,296,400 B2
(45) Date of Patent: Oct. 23, 2012

(54) SYSTEM AND METHOD FOR GENERATING A CONFIGURATION SCHEMA

(75) Inventors: Scott B. Gorthy, Colorado Springs, CO (US); Brendan Kelly, Colorado Springs, CO (US); Derek S. Hearne, Tucson, AZ (US); David B. Heiser, Peyton, CO (US); Bret C. Taylor, Colorado Springs, CO (US)

(73) Assignee: International Business Machines Corporation, Armonk, NY (US)

( * ) Notice: Subject to any disclaimer, the term of this patent is extended or adjusted under 35 U.S.C. 154(b) by 3495 days.

(21) Appl. No.: 09/942,834

(22) Filed: Aug. 29, 2001

(65) Prior Publication Data
US 2003/0051008 A1    Mar. 13, 2003

(51) Int. Cl.
G06F 15/177    (2006.01)
(52) U.S. Cl. .................... 709/220; 709/222; 709/228
(58) Field of Classification Search .................. 709/217, 709/220, 221, 223, 224, 222, 228
See application file for complete search history.

(56) References Cited

U.S. PATENT DOCUMENTS

| 4,991,089 A | 2/1991 | Shorter |
| 5,109,486 A | 4/1992 | Seymour |
| 5,159,685 A | 10/1992 | Kung |
| 5,442,791 A | 8/1995 | Wrabetz et al. |
| 5,475,819 A | 12/1995 | Miller et al. |
| 5,491,820 A | 2/1996 | Belove et al. |
| 5,506,966 A | 4/1996 | Ban |
| 5,519,704 A | 5/1996 | Farinacci et al. |
| 5,535,335 A | 7/1996 | Cox |
| 5,557,748 A | 9/1996 | Noris |
| 5,581,764 A | 12/1996 | Fitzgerald et al. |
| 5,659,746 A | 8/1997 | Bankert |
| 5,680,551 A | 10/1997 | Martino |
| 5,724,509 A | 3/1998 | Starkweather et al. |
| 5,726,883 A | 3/1998 | Levine et al. |
| 5,751,965 A | 5/1998 | Mayo |
| 5,751,967 A | 5/1998 | Raab et al. |
| 5,764,955 A | 6/1998 | Doolan |
| 5,784,702 A | 7/1998 | Greenstein et al. |
| 5,787,246 A | 7/1998 | Lichtman et al. |
| 5,796,732 A | 8/1998 | Mazzola et al. |

(Continued)

FOREIGN PATENT DOCUMENTS
EP    0 384 339 A2    8/1990
(Continued)

OTHER PUBLICATIONS

Stephen Liu, "Cisco IOS Command Line Interface Tutorial", 1997, Small/Medium Business Solutions, www.cisco.com/warp/cpropub/45/tutorial.htm.*

(Continued)

Primary Examiner — Tonia L Dollinger
Assistant Examiner — Adam Cooney
(74) Attorney, Agent, or Firm — Stephen R. Tkacs; Stephen J. Walder, Jr.; Jeffrey S. LaBaw

(57) ABSTRACT

A system and method for interfacing with a network component is described. One embodiment includes an electronic method that accesses a network component; retrieves a command set from the network component; generates a configuration schema corresponding to the network component using the retrieved command set; and then stores the generated configuration schema.

11 Claims, 8 Drawing Sheets

U.S. PATENT DOCUMENTS

| | | |
|---|---|---|
| 5,812,768 A | 9/1998 | Page |
| 5,819,028 A | 10/1998 | Manghirmalani et al. |
| 5,819,042 A * | 10/1998 | Hansen .................... 709/222 |
| 5,832,503 A | 11/1998 | Malik et al. |
| 5,838,918 A | 11/1998 | Prager et al. |
| 5,842,040 A | 11/1998 | Hughes et al. |
| 5,852,740 A | 12/1998 | Estes |
| 5,872,928 A | 2/1999 | Lewis et al. |
| 5,878,432 A | 3/1999 | Misheski |
| 5,884,028 A | 3/1999 | Kindell et al. |
| 5,889,943 A | 3/1999 | Ji |
| 5,889,953 A | 3/1999 | Thebaut et al. |
| 5,901,320 A | 5/1999 | Takahashi |
| 5,920,701 A | 7/1999 | Miller et al. |
| 5,923,850 A | 7/1999 | Barroux |
| 5,944,782 A | 8/1999 | Noble et al. |
| 5,948,065 A | 9/1999 | Eilert et al. |
| 5,956,341 A | 9/1999 | Galand et al. |
| 5,961,594 A | 10/1999 | Bouvier et al. |
| 5,968,122 A | 10/1999 | Schlosser et al. |
| 5,968,176 A | 10/1999 | Nessett et al. |
| 5,974,236 A | 10/1999 | Sherman |
| 5,980,078 A | 11/1999 | Krivoshein et al. |
| 5,999,948 A | 12/1999 | Nelson |
| 6,006,035 A | 12/1999 | Nabahi |
| 6,014,697 A | 1/2000 | Lewis et al. |
| 6,016,306 A | 1/2000 | Le Boudec et al. |
| 6,023,586 A | 2/2000 | Gaisford et al. |
| 6,028,846 A | 2/2000 | Cain |
| 6,041,347 A | 3/2000 | Harsham et al. |
| 6,049,828 A | 4/2000 | Dev et al. |
| 6,055,568 A | 4/2000 | Adams |
| 6,085,253 A | 7/2000 | Blackwell |
| 6,088,804 A | 7/2000 | Hill et al. |
| 6,097,697 A | 8/2000 | Yao et al. |
| 6,098,094 A | 8/2000 | Barnhouse et al. |
| 6,098,101 A | 8/2000 | Sears |
| 6,098,108 A | 8/2000 | Sridhar et al. |
| 6,101,508 A | 8/2000 | Wolff |
| 6,104,700 A | 8/2000 | Haddock et al. |
| 6,105,069 A | 8/2000 | Franklin et al. |
| 6,108,699 A | 8/2000 | Moiin |
| 6,108,703 A | 8/2000 | Leighton et al. |
| 6,122,664 A | 9/2000 | Boukobza et al. |
| 6,128,729 A | 10/2000 | Kimball et al. |
| 6,131,118 A | 10/2000 | Stupek, Jr. et al. |
| 6,131,119 A | 10/2000 | Fukui |
| 6,154,776 A | 11/2000 | Martin |
| 6,167,445 A | 12/2000 | Gai et al. |
| 6,170,009 B1 | 1/2001 | Mandal et al. |
| 6,170,011 B1 | 1/2001 | Macleod Beck et al. |
| 6,173,312 B1 | 1/2001 | Atarashi |
| 6,182,094 B1 | 1/2001 | Humpleman et al. |
| 6,198,479 B1 | 3/2001 | Humpleman et al. |
| 6,202,090 B1 | 3/2001 | Simone |
| 6,211,877 B1 | 4/2001 | Steele |
| 6,226,654 B1 | 5/2001 | Van Hoff |
| 6,240,458 B1 | 5/2001 | Gilbertson |
| 6,243,747 B1 | 6/2001 | Lewis et al. |
| 6,243,815 B1 | 6/2001 | Antur |
| 6,247,049 B1 | 6/2001 | Scott |
| 6,253,240 B1 | 6/2001 | Axberg |
| 6,260,072 B1 | 7/2001 | Rodriguez-Moral |
| 6,269,398 B1 | 7/2001 | Leong et al. |
| 6,272,526 B1 | 8/2001 | Robinson |
| 6,286,038 B1 | 9/2001 | Reichmeyer |
| 6,292,889 B1 | 9/2001 | Fitzgerald et al. |
| 6,338,149 B1 | 1/2002 | Ciccone |
| 6,349,306 B1 | 2/2002 | Malik et al. |
| 6,356,955 B1 | 3/2002 | Hollberg et al. |
| 6,363,411 B1 | 3/2002 | Dugan et al. |
| 6,363,421 B2 | 3/2002 | Barker |
| 6,370,119 B1 | 4/2002 | Basso et al. |
| 6,374,293 B1 | 4/2002 | Dev |
| 6,381,631 B1 | 4/2002 | Van Hoff |
| 6,393,425 B1 | 5/2002 | Kelly |
| 6,418,468 B1 | 7/2002 | Ahlstrom et al. |
| 6,426,959 B1 | 7/2002 | Jacobson |
| 6,438,594 B1 | 8/2002 | Bowman-Amuah |
| 6,442,608 B1 | 8/2002 | Knight et al. |
| 6,449,638 B1 | 9/2002 | Wecker et al. |
| 6,449,646 B1 | 9/2002 | Sikora |
| 6,453,255 B1 | 9/2002 | Smorodinsky |
| 6,463,583 B1 | 10/2002 | Hammond |
| 6,470,453 B1 | 10/2002 | Vilhuber |
| 6,473,775 B1 | 10/2002 | Kusters |
| 6,496,843 B1 | 12/2002 | Getchius et al. |
| 6,496,858 B1 | 12/2002 | Frailong |
| 6,539,425 B1 | 3/2003 | Stevens et al. |
| 6,546,416 B1 | 4/2003 | Kirsch |
| 6,550,060 B1 | 4/2003 | Hammond |
| 6,564,056 B1 | 5/2003 | Fitzgerald |
| 6,567,406 B1 | 5/2003 | Skemer |
| 6,571,285 B1 | 5/2003 | Groath |
| 6,598,177 B1 | 7/2003 | Jones |
| 6,609,108 B1 | 8/2003 | Pulliam et al. |
| 6,615,166 B1 | 9/2003 | Guheen et al. |
| 6,615,218 B2 | 9/2003 | Mandal |
| 6,625,590 B1 | 9/2003 | Chen et al. |
| 6,628,304 B2 | 9/2003 | Mitchell |
| 6,636,877 B1 | 10/2003 | Doleac et al. |
| 6,643,289 B1 | 11/2003 | Natanson |
| 6,643,640 B1 | 11/2003 | Getchius et al. |
| 6,654,799 B1 | 11/2003 | Tanaka |
| 6,658,526 B2 | 12/2003 | Nguyen et al. |
| 6,678,370 B1 * | 1/2004 | Freebersyser et al. ... 379/221.04 |
| 6,678,827 B1 | 1/2004 | Rothermel et al. |
| 6,684,241 B1 * | 1/2004 | Sandick et al. ............... 709/220 |
| 6,684,244 B1 | 1/2004 | Goldman et al. |
| 6,697,967 B1 | 2/2004 | Robertson |
| 6,725,233 B2 | 4/2004 | Froyd et al. |
| 6,725,262 B1 | 4/2004 | Choquier |
| 6,725,264 B1 | 4/2004 | Christy |
| 6,732,175 B1 | 5/2004 | Abjanic |
| 6,738,910 B1 | 5/2004 | Genty |
| 6,760,761 B1 | 7/2004 | Sciacca |
| 6,760,767 B1 | 7/2004 | Miesbauer |
| 6,766,369 B1 | 7/2004 | Haitsuka |
| 6,769,116 B1 | 7/2004 | Sexton |
| 6,772,206 B1 | 8/2004 | Lowry |
| 6,775,698 B1 | 8/2004 | Simone |
| 6,782,474 B1 | 8/2004 | Ylonen |
| 6,810,427 B1 | 10/2004 | Cain |
| 6,816,897 B2 * | 11/2004 | McGuire ...................... 709/223 |
| 6,826,597 B1 | 11/2004 | Lonnroth et al. |
| 6,832,247 B1 | 12/2004 | Cochran |
| 6,834,298 B1 | 12/2004 | Singer |
| 6,847,994 B1 | 1/2005 | Akimoto |
| 6,865,673 B1 | 3/2005 | Nessett |
| 6,895,431 B1 | 5/2005 | Bero |
| 6,895,588 B1 | 5/2005 | Ruberg |
| 6,907,572 B2 * | 6/2005 | Little et al. ................... 715/762 |
| 6,931,016 B1 | 8/2005 | Andersson |
| 6,931,444 B2 | 8/2005 | Schweitzer |
| 6,938,079 B1 | 8/2005 | Anderson |
| 6,959,332 B1 * | 10/2005 | Zavalkovsky et al. ........ 709/223 |
| 6,978,301 B2 | 12/2005 | Tindal |
| 6,990,591 B1 | 1/2006 | Pearson |
| 7,003,560 B1 | 2/2006 | Mullen |
| 7,016,955 B2 | 3/2006 | Martin |
| 7,127,526 B1 | 10/2006 | Duncan |
| 7,145,871 B2 | 12/2006 | Levy |
| 2001/0034771 A1 | 10/2001 | Hutsch |
| 2001/0053991 A1 | 12/2001 | Bonabeau |
| 2002/0007411 A1 | 1/2002 | Shaked |
| 2002/0032769 A1 | 3/2002 | Barkai et al. |
| 2002/0032775 A1 | 3/2002 | Venkataramaiah |
| 2002/0032871 A1 | 3/2002 | Malan |
| 2002/0038320 A1 | 3/2002 | Brook |
| 2002/0051080 A1 | 5/2002 | Tanaka |
| 2002/0052719 A1 | 5/2002 | Alexander |
| 2002/0069143 A1 | 6/2002 | Cepeda |
| 2002/0072956 A1 | 6/2002 | Willems |
| 2002/0078068 A1 | 6/2002 | Krishnaprasad |
| 2002/0078382 A1 | 6/2002 | Sheikh |
| 2002/0143927 A1 * | 10/2002 | Maltz et al. ................... 709/224 |
| 2002/0161863 A1 | 10/2002 | McGuire |

| | | | |
|---|---|---|---|
| 2002/0169858 | A1 | 11/2002 | Bellinger |
| 2002/0171762 | A1 | 11/2002 | Maxson et al. |
| 2002/0173997 | A1 | 11/2002 | Menard |
| 2002/0174091 | A1 | 11/2002 | Froyd et al. |
| 2002/0191619 | A1 | 12/2002 | Shafer |
| 2002/0194289 | A1 | 12/2002 | Engel |
| 2002/0198974 | A1 | 12/2002 | Shafer |
| 2003/0016685 | A1 | 1/2003 | Berggreen |
| 2003/0018702 | A1 | 1/2003 | Broughton |
| 2003/0018765 | A1 | 1/2003 | Muhlestein |
| 2003/0033589 | A1 | 2/2003 | Reyna et al. |
| 2003/0037040 | A1 | 2/2003 | Beadles et al. |
| 2003/0048287 | A1* | 3/2003 | Little et al. ............. 345/705 |
| 2003/0061312 | A1 | 3/2003 | Bodner |
| 2003/0065919 | A1 | 4/2003 | Albert |
| 2003/0084009 | A1 | 5/2003 | Bigus |
| 2003/0135508 | A1 | 7/2003 | Chorafakis et al. |
| 2003/0135547 | A1 | 7/2003 | Kent |
| 2003/0158894 | A1 | 8/2003 | Ziserman |
| 2003/0187964 | A1 | 10/2003 | Sage |
| 2003/0200459 | A1 | 10/2003 | Seeman |
| 2004/0001493 | A1 | 1/2004 | Cloonan |
| 2004/0015592 | A1 | 1/2004 | Selgas |
| 2004/0024736 | A1 | 2/2004 | Sakamoto |
| 2004/0078695 | A1 | 4/2004 | Bowers et al. |
| 2004/0225865 | A1 | 11/2004 | Cox et al. |

FOREIGN PATENT DOCUMENTS

| | | |
|---|---|---|
| EP | 745929 A1 | 12/1996 |
| EP | 0 810 755 A2 | 12/1997 |
| EP | 0 762 281 A3 | 3/1999 |
| EP | 0952521 A2 | 10/1999 |
| EP | 0 973 296 A2 | 1/2000 |
| EP | 0 993 725 A1 | 4/2000 |
| EP | 1 011 230 A2 | 6/2000 |
| EP | 1 012 726 A1 | 6/2000 |
| EP | 1 026 867 A2 | 8/2000 |
| EP | 1 047 226 A2 | 10/2000 |
| EP | 1 090 492 A1 | 4/2001 |
| EP | 1 091 526 A2 | 4/2001 |
| GB | 2 368 692 A | 5/2002 |
| JP | 8139757 A | 5/1996 |
| WO | WO 95/08794 | 3/1995 |
| WO | WO 95/24802 A | 9/1995 |
| WO | WO 97/49214 | 12/1997 |
| WO | WO 98/18235 A | 4/1998 |
| WO | WO 98/24208 | 6/1998 |
| WO | WO 99/01968 | 1/1999 |
| WO | WO 99/11003 | 3/1999 |
| WO | WO 99/67931 | 12/1999 |
| WO | WO 00/04665 | 1/2000 |
| WO | WO 00/41091 | 7/2000 |
| WO | WO 01/01293 A2 | 1/2001 |
| WO | WO 01/19031 A1 | 3/2001 |
| WO | WO 01/47185 A2 | 6/2001 |
| WO | WO 01/47186 A2 | 6/2001 |
| WO | WO 02/47332 A2 | 6/2002 |

OTHER PUBLICATIONS

Managing Managed Network Services: The Service Provider Blind Spot; Infonetics Research, The Networking Information Source; Jun. 2000 (18 pages).
ISM Customer—Aware™ Query; CoManage Corporation; As of Dec. 5, 2000 (2 pages).
ISM Customer—Aware™ Provisioning; CoManage Corporation; As of Dec. 5, 2000 (2 pages).
ISM Customer—Aware™ Deep Discovery™; CoManage Corporation; As of Dec. 5, 2000 (2 pages).
ISM Customer—Aware™ Service Profiling; CoManage Corporation; As of Dec. 5, 2000 (2 pages).
ISM Customer—Aware™ Fault and Performance Management; CoManage Corporation; As of Dec. 5, 2000 (2 pages).
"FFST/2 Generic Alert Router for LAN and SNA Transports," IBM Technical Disclosure Bulletin, IBM Corp. New York, vol. 34, No. 11, Apr. 1, 1992, pp. 467-468, XP000303331, ISSN: 0018-8689.
Torrente S et al: "Implementation of the ANSI TIM1.5 GBM-T1.214 within an ODBMS framework" Networking: Foundation for the Future, San Francisco, Mar. 28-Apr. 1, 1993, Proceedings of the Annual Joint Conference of the Computer and Communications Societies (INFOCOM), Los Alamitos, IEE Comp. Soc. Press, US, vol. 2 Conf. 12, Mar. 28, 1993, pp. 875-884, XP010032227, ISBN: 0-8186-3580-0.
Kennedy T W: "Network Operations & Management Tool Requirements for the 90s" Proceedings of the Network Operations and Management Symposium (NOMS). Memphis, Apr. 6-9, 1992, New York, IEEE, U.S. Vo. 1, 1992, pp. 122-132.
Lee, W.C. et al: "Routing Subject to Quality of Service Constraints in Integrated Communication Networks" IEEE Network, IEEE Inc. New York, US, vol. 9, No. 4, Jul. 1, 1995, pp. 46-55, XP000526591, ISSN: 0890-8044 the whole document.
Williams R: "Web Based Enterprise Management W101" DMTF 1999 Annual Conference, 'Online! Jun. 15-16, 1999, pp. 1-21.
Wolfson, Ouri et al.: "Managing Communication Networks by Monitoring Databases", IEEE Transactions on Software Engineering, IEEE Inc. New York, US, vol. 17, No. 9 Sep. 1, 1991, pp. 944-953.
PCT/US 01/45668—International Search Report dated Oct. 16, 2002.
PCT/US 01/45669—International Search Report dated Oct. 16, 2002.
PCT/US 01/45671—International Search Report dated Oct. 16, 2002.
PCT/US 01/45670—International Search Report dated Dec. 20, 2002.
PCT/US 01/45672—International Search Report dated Apr. 14, 2003.
PCT/US 01/45671—Written Opinion dated Dec. 13, 2002.
Lonvick, C. The BSD syslog Protocol. RFC 3164 [online], Aug. 2001 [retrieved on Mar. 25, 2002]. Retrieved from the Internet ,<url: HTTP://www.ietf.org/rfc/rfc3164.txt>.
Case, J., A Simple Network Management Protocol (SNMP). RFC 1098 [online], Apr. 1989 [retrieved on Mar. 26, 2002]. Retrieved from the internet <URL: http://www.ietf.org/rfc/rfc1098.txt?number=1098>.
Postel, J.B. Simple Mail Transfer Protocol. RFC 821 [online], Aug. 1982 [retrieved on Mar. 26, 2002]. Retrieved from the Internet <URL: http:///www.ietf.org/rfc/rfc0821.txt?number=821>.
Finseth, C. An Access Control Protocol, Sometimes called TACACS. RFC 1492 [online], Jul. 1993 [retrieved on Mar. 25, 2002]. Retrieved from the Internet <URL: http://www.cis.ohio-state.edu/cgi-bin/rfc/rfc1492.html>.
Anderson, B.A. TACACS User Identification Telnet Option. RFC 927 [online], Dec. 1984 [retrieved on Mar. 25, 2002]. Retrieved from the Internet <URL: http://www.ietf.org/rfc/rfc0927.txt>.
Rigney, C., et al. Remote Authentication Dial in User Service (RADIUS). RFC 2138 [online], Apr. 1997 {retrieved on Mar. 25, 2002]. Retrieved from the Internet <URL: http://www.ietf.org/rfc/rfc2138.txt>.
Rigney, C., Radius Accounting. RFC 2139 [online], Apr. 1997 [retrieved on Mar. 25, 2002]. Retrieved from the Internet <URL: http://www.ietf.org/rfc/rfc2139.txt>.
Postel, J., and Reynolds, J. Telnet Protocol Specification. RFC 854 [online], May 1983 [retrieved on Mar. 25, 2002]. Retrieved from the Internet <URL: http://www.ietf.org/rfc/rfc0854.txt>.
Gold Wire Technology, "Tracking Changes." in *Formulator 1.0 User Guide*, pp. 211-224.
Lewis, L., "*Policy-Based Configuration Management: A Perspective from a Network Management Vendor*," http://www.simple-times.org./pub/simple-times/issues/8-1.html., pp. 7-27.
Waldbusser, St., et al., "Policy Based Management MIB," http://www.ietf.org/internet-drafts/draft-ietf-snmpconf-pm-05.txt, pp. 1-102.
Strassner, J., *A New Paradigm for Network Management: Business Deriven Device Management*,[online], 2002, http://www.ssgrr.it/en/ssgrr2002s/papers.htm, http://www.ssgrr.it/en/ssggrr2002s/papers/162.pdf.
Noms, IEEE 1992 Network Operations and Management Symposium, 1992, vol. 1, IEEE Communications Society, New York, USA.
HP OpenView for Windows Workgroup Node Manager User Guide, 3COM, Jan. 1997, Part No. 09-1114-000, Hewlett-Packard Co., Santa Clara, CA USA.

Administrator's Guide, Formulator 3.0, 2000-2002, Gold Wire Technology Inc.

User Guide, Formulator 1.0, 2000-2001, Gold Wire Technology Inc.

Superstack II Hub TR Network Management Module Installation Guide, 3COM Jan. 1997, Hewlett-Packard Co., Santa Clara, CA USA.

Initially Configuring the ATM Switch Router, Cisco, Oct. 19, 2000, pp. 1-42.

Common Information Model—A Developer's Perspective, IEEE, 1998, p. 1.

Yeong et al., Lightweight Directory Access Protocol, RFC 1487, Jul. 1993.

* cited by examiner

| CISCO | 12.0 | 12.2 | x.0 | x.1 | x.2 |
|---|---|---|---|---|---|
| 7500 | Schema A | Schema B | | | |
| 6509 | | | | | |
| xxxx | | | | | |
| xxxy | | | | | |

| Juniper | x.0 | x.1 | x.2 | x.3 | x.4 |
|---|---|---|---|---|---|
| M20 | | | | | |

| Ciena | x.0 | x.1 | x.2 | x.3 | x.4 |
|---|---|---|---|---|---|
| Multiwave 4000 | | | | | |

FIGURE 4.

SYSTEM AND METHOD FOR GENERATING A CONFIGURATION SCHEMA

RELATED APPLICATIONS

The present application is related to commonly owned and assigned application Nos.:
Ser. No. 09/730,864 entitled System and Method for Configuration, Management and Monitoring of Network Resources, filed Dec. 6, 2000;
Ser. No. Ser. No. 09/730,680 entitled System and Method for Redirecting Data Generated by Network Devices, filed Dec. 6, 2000;
Ser. No. 09/730,863 entitled Event Manger for Network Operating System, filed Dec. 6, 2000;
Ser. No. 09/730,671 entitled Dynamic Configuration of Network Devices to Enable Data Transfers, filed Dec. 6, 2000;
Ser. No. 09/730,682 entitled Network Operating System Data Directory, filed Dec. 6, 2000; and
Ser. No. 09/799,579 entitled Global GUI Interface for Network OS, filed Mar. 6, 2001;
all of which are incorporated herein by reference.

FIELD OF THE INVENTION

The present invention relates to network device interrogation and configuration. In particular, but not by way of limitation, the present invention relates to systems and methods for interrogating and configuring routers, switches, hubs, and/or optical components.

BACKGROUND OF THE INVENTION

Networks, and in particular, the Internet, have revolutionized communications. Data vital to the continued prosperity of the world economy is constantly being exchanged between end-users over these networks. Unfortunately, the expansion and maintenance of these networks is outpaced by the demand for additional bandwidth. Network equipment is often difficult to configure, and qualified network technicians are in extremely short supply. Thus, many needed network expansions and upgrades must be delayed until these technicians are available. While these upgrades and expansions are pending, end-users continue to suffer poor network performance.

For example, Cisco™ routers are notoriously difficult to configure—especially in light of the new XML-based interfaces introduced by competitors such as Juniper Networks™. Instead of a user-friendly XML-based interface, Cisco™ uses a cumbersome command line interface (CLI) for its routers. Cisco's™ CLI interface is the result of many years of semi-controlled modifications to its router operating systems and has resulted in a tangled mess of commands and subcommands.

If Cisco™ attempted to abandon its CLI in favor of the new user-friendly XML-based interface, many years of development and expertise could be lost. Moreover, even if it could develop an XML-based interface, there is presently no economical way to integrate it into the thousands of existing routers. Despite the difficulties in implementing a more user-friendly interface, to remain competitive, Cisco™ and similarly situated companies need to move away from the CLI. However, present technology does not provide these companies with an acceptable option that allows continued use of its extensive CLI knowledge base while simultaneously providing system administrators with a user-friendly interface, e.g., XML-based interface. Moreover, present technologies do not provide an acceptable way to provide backward compatibility with existing devices.

Cisco™ is not the only manufacturer to face this interface-upgrade problem. Many manufacturers would like to continue using their existing interface knowledge base while providing system administrators a friendly, consistent interface. Accordingly, a system and method are needed that will allow manufacturers, like Cisco™, to create user-friendly interfaces for both next-generation and existing devices.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Embodiments of the present invention can provide a system and method for generating a configuration schema for network devices. Other embodiments can provide a system and method for configuring network devices using a configuration schema. These and other embodiments are discussed more fully below.

In one implementation of the present invention, a system administrator connects and logs into a router—although it could be any network device. The system administrator then places the router in a command extraction mode. For example, with regard to a Cisco™ router, the system administrator can activate a "help" mode that can be navigated to identify commands, subcommands and/or associated bounds. Once the router has been placed in the extraction mode, the primary commands, subcommands and bounds are extracted through an automated process.

After the commands, subcommands and bounds have been extracted, they can be stored and, if necessary, cleansed. With regard to a Cisco™ router, cleansing is often beneficial because subcommands can be listed multiple times within the "help" structure. For example, the command "peer" might be included twice in the command structure. The first "peer" could be associated with subcommands "A" and "B," and the second "peer" could be associated with subcommands "C" and "D." Thus, although the primary command, "peer" is the same in both instances, the subcommands under each "peer" are different. The cleansing step could recognize this dual listing situation, and appropriately associated the "peer" command to specific configuration change activity. In essence, the cleansing step can clarify the definitions of the duplicated subcommands. In other words, the end result of the cleansing could be a single "peer" command that includes the subcommands "A," "B," "C," and "D."

When the commands (including subcommands) and bounds have been collected, a configuration schema can be generated using that information. For example, the commands and bounds can be the basis for generating an XML configuration schema that expresses the command hierarchy and the bounds for the commands in a structured format.

Although schema are generally used to validate commands, in one implementation of the present invention, the configuration schema can be used to generate commands. For example, a configuration command can be retrieved from a Cisco™ router. This configuration command is generally expressed in terms of a CLI-based command structure. Using the XML configuration schema, however, the CLI-based commands can be converted to an XML format, which is significantly more manageable than a CLI-based format. Once the CLI-based command has been converted to an XML format, the XML format of the command can be easily passed between various computers and system administrators in a highly readable, standardized format.

In another implementation, the schema can be used to generate CLI commands from, for example, XML-based commands. As previously described, the configuration schema contains the commands, command hierarchy and bounds of the various configuration commands. When given a command in XML format, the command information in the configuration schema can be used to reformat the XML-based command into a proper CLI format. Once reformatted into a CLI format, the command can be pushed out to the appropriate router. Thus, a system administrator could configure such a router without knowing the specifics of the CLI.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

FIG. 4 is a representation of one storage model for storing configuration schema across different device types, manufacturers, models and operating system versions;

DETAILED DESCRIPTION

Figure 1:
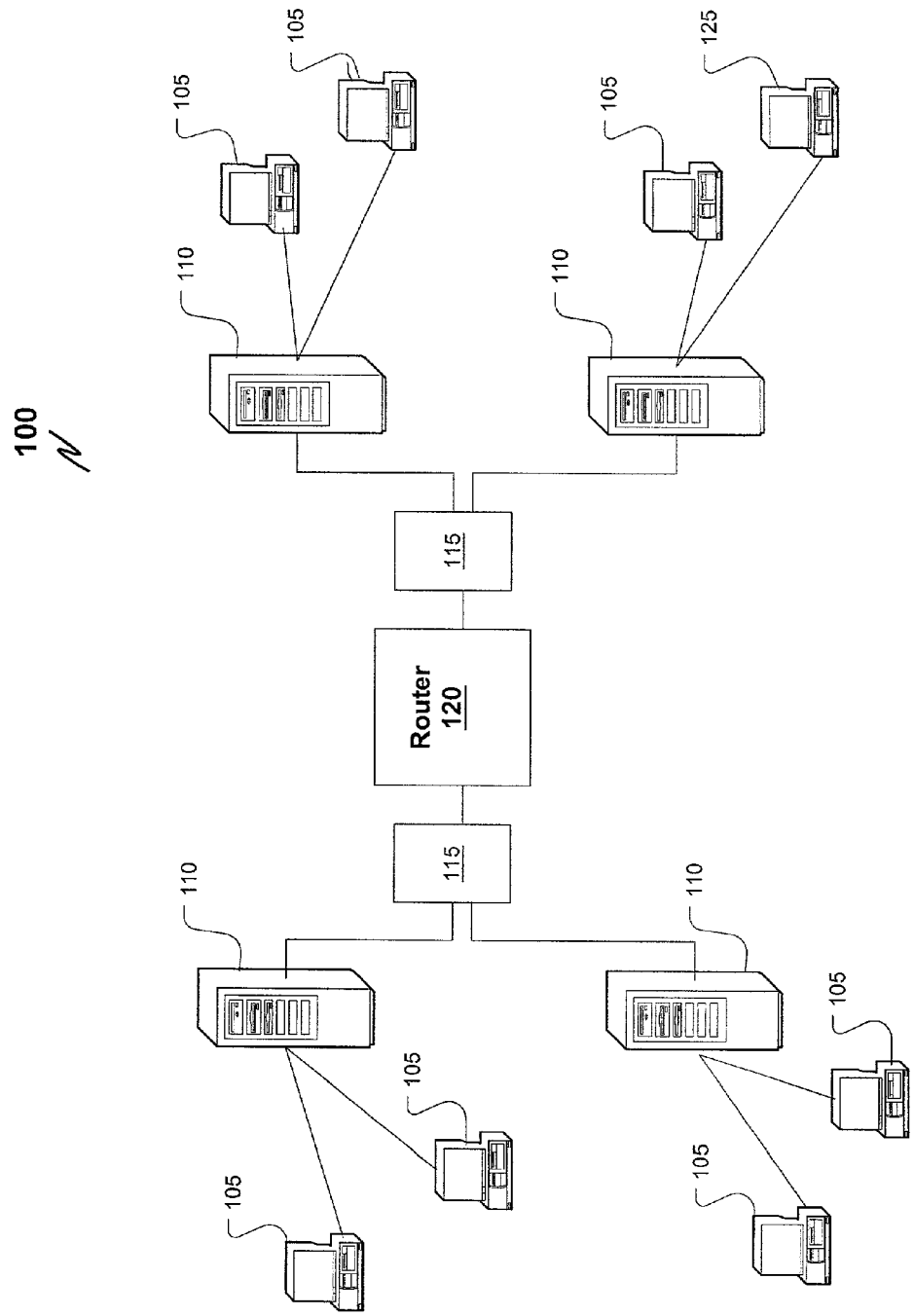
FIG. 1 is a block diagram of a conventional network.

Referring now to the drawings, where like or similar elements are designated with identical reference numerals throughout the several views, and referring in particular to FIG. 1, it illustrates a block diagram of a conventional network system 100. In this network system 100, end-users 105 are connected to servers 110, which are connected to networking equipment such as hubs, (not shown) optical components 115, and routers 120. Using the networking equipment, end-users 105 associated with different servers 110 can exchange data.

As new servers 110 and end-users 105 are added to the overall system 100, or as new software becomes available, the routers 120 and/or optical components 115 of the network system 100 may need reconfiguring. To reconfigure these components, a system administrator 125—with the proper authorization—could access the router 120 and/or optical component 115 by, for example, establishing a telnet connection to the component and transferring configuration instructions thereto.

Figure 2:
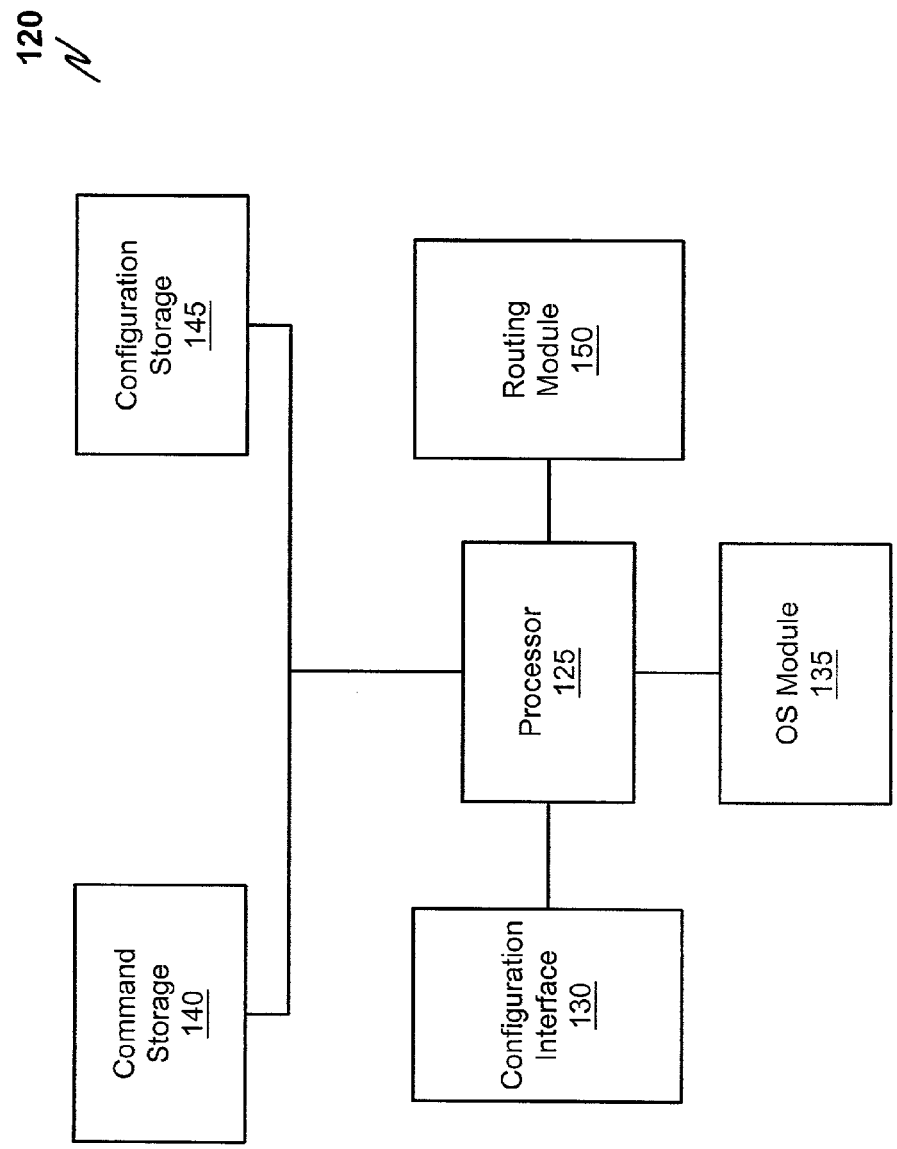
FIG. 2 is a block diagram of a conventional router.

Referring now to FIG. 2, it is a block diagram of a conventional router. In this representation, a processor 125 is connected to a configuration interface 130, an operating system (OS) storage module 135, a command storage module 140, a configuration storage module 145, and a routing module 150. The illustrated arrangement of these components is logical and not meant to be an actual hardware diagram. Thus, the components can be combined or further separated in an actual implementation. Moreover, the construction of each individual component is well-known to those of skill in the art.

When a system administrator 125 wishes to reconfigure a router 120, he accesses the router 120 through the configuration interface 130 and retrieves the present configuration for the router 120 from the configuration storage module 145. The system administrator 125 can review available configuration commands and bounds—usually in a CLI format—by accessing and reviewing the commands stored in the command storage module 140. In essence, the command storage module 140 provides the knowledge base for a "help" screen. The commands stored in the command storage module 140 are generally unique to the particular OS version stored in the OS module 135.

After the system administrator 125 has constructed the new configuration instructions, these instructions are pushed through the configuration interface 130 and stored in the configuration storage module 145. For Cisco™ routers, interaction is generally through a CLI. In other words, the command storage module 140 is queried through the CLI; available commands are returned through the CLI; and new configuration commands are provided to the router 120 through the CLI. Unfortunately, the CLI is difficult to manage and requires highly skilled technicians for even simple tasks.

Figure 3:
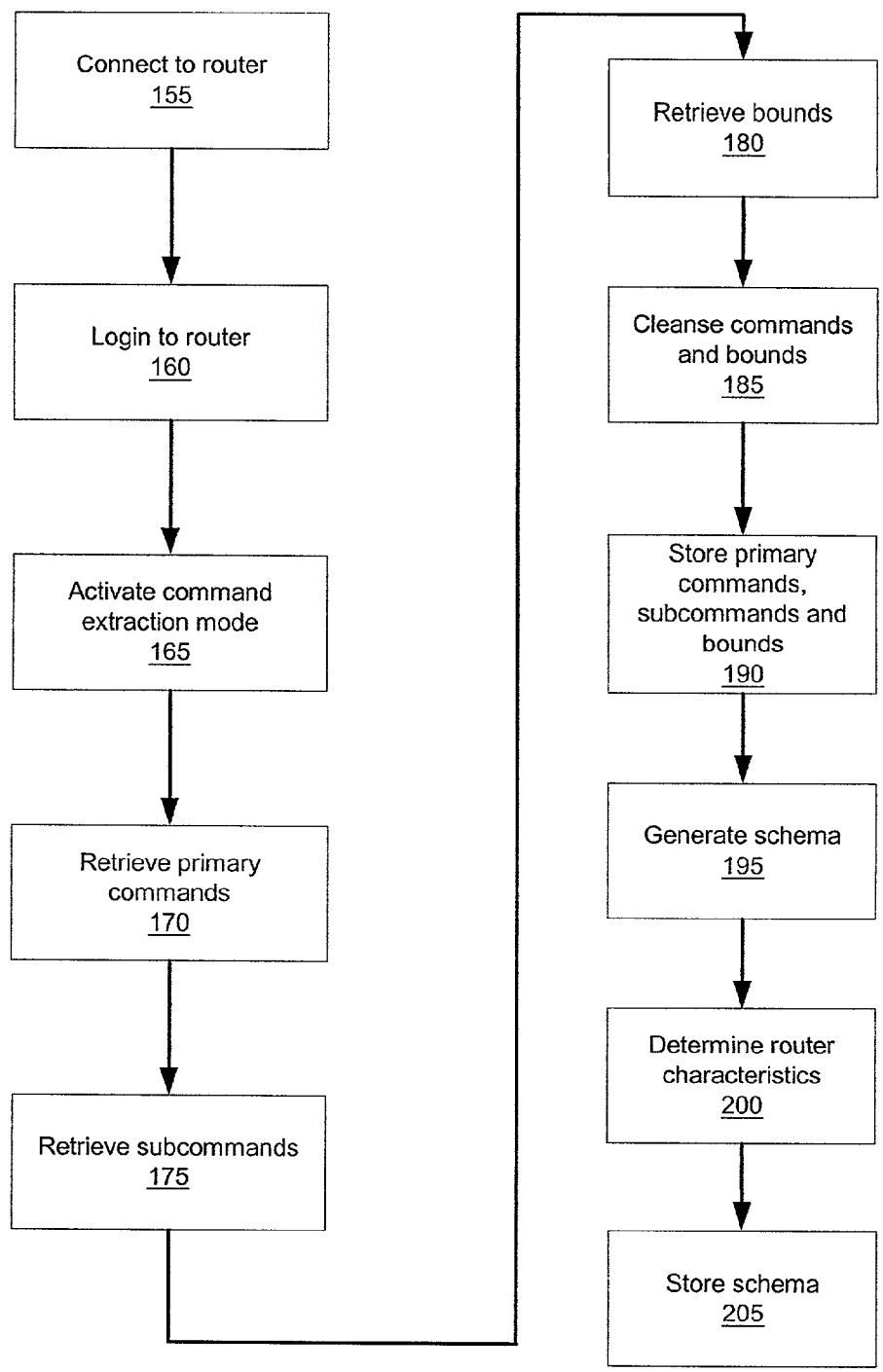
FIG. 3 is a flowchart of a method for generating a configuration schema in accordance with one embodiment of the present invention.

Referring now to FIG. 3, it is a flowchart of one method for generating a configuration schema in accordance with the principles of the present invention. The illustrated method can be used, for example, to generate an XML schema from the CLI commands associated with a Cisco™ router. In accordance with the principles of the present invention, one method for constructing a configuration schema involves a system administrator 125 (in conjunction with an automated system) connecting to a router 120 through, for example, a telnet connection. Next, the system administrator 125 logs into the router 120 and activates a command extraction mode (steps 160 and 165). With regard to a Cisco™ router, the command extraction mode is activating by entering a"?" at the prompt. Next, the system administrator 125 retrieves the primary commands, subcommands and bounds (steps 170, 175 and 180). This retrieval can be done through an automated, recursive search. For a Cisco™ router, the following search could be executed and the following results returned where ">" is the CLI prompt:

> ?
router
admin
global
> router?
bgp
ospf
>

This process could be repeated until termination for each command and subcommand. The output of a retrieval process, called a text file, for the "service" command is shown in attached Appendix A.

Once the commands, subcommands, and bounds are collected, they can then be recorded and cleansed (steps 185 and 190). Duplicate commands, for example, could be identified. When these duplicate commands include different subcommands and/or bounds, a single, cleansed command can be constructed to replace the duplicate commands. The cleansed commands, assuming that cleansing was necessary, can then be used to build a configuration schema, which in essence is a modeling of the router's command structure (step 195). An example snippet of such a modeling in an XML schema is represented by:

```
<xsd:element name="vlan">
    <xsd:complexType>
        <xsd:choice>
            <xsd:sequence>
                <xsd:element name="mapping">
                <xsd:complexType/>
            </xsd:element>
            <xsd:element name="dot1q" fixed="dot1q">
                <xsd:complexType/>
            <xsd:element>
            <xsd:element name="ARG.001".
                <xsd:simpleType>
                .
                .
                .
        </xsd:choice>
    </xsd:complexType>
</xsd:element>
```

A more detailed example of an XML configuration schema is shown in Appendix B. The configuration schema in Appendix B corresponds to the "service" command, which is represented in Appendix A.

In one embodiment, the conversion between the text file, such as the one shown in Appendix A, and the XML configuration schema is performed by a Visual Basic program. This program identifies arrays of related commands in the text file. Individual arrays can be identified, for example, because they are generally separated by termination characters or by logical termination indicators. Additionally, when an input indicator is encountered in the text file, the program can insert a placeholder into the configuration schema to represent the input indicator. This placeholder can then be associated with the bounds for that particular input. For example, if the input corresponding to the input indicator should be between 1 and 10, a bound of 1 to 10 can be associated with the placeholder.

After the configuration schema has been generated, it is associated with characteristics of the router and stored accordingly (steps 200 and 205). For example, the configuration schema might be associated with a Cisco™ router, model 7500, OS version 12.0. A representation of a storage model 210 for storing configuration schema according to manufacturer, device type, device model, and OS version is shown in FIG. 4. The first data block 215 is dedicated to Cisco™ routers as indicated in the upper left-hand corner. Each row represents a different model of Cisco™ device, and each column represents a different OS version. Similarly, the second data block is for Juniper™ routers 220 and the third is for Ciena™ devices 225.

Figure 5:
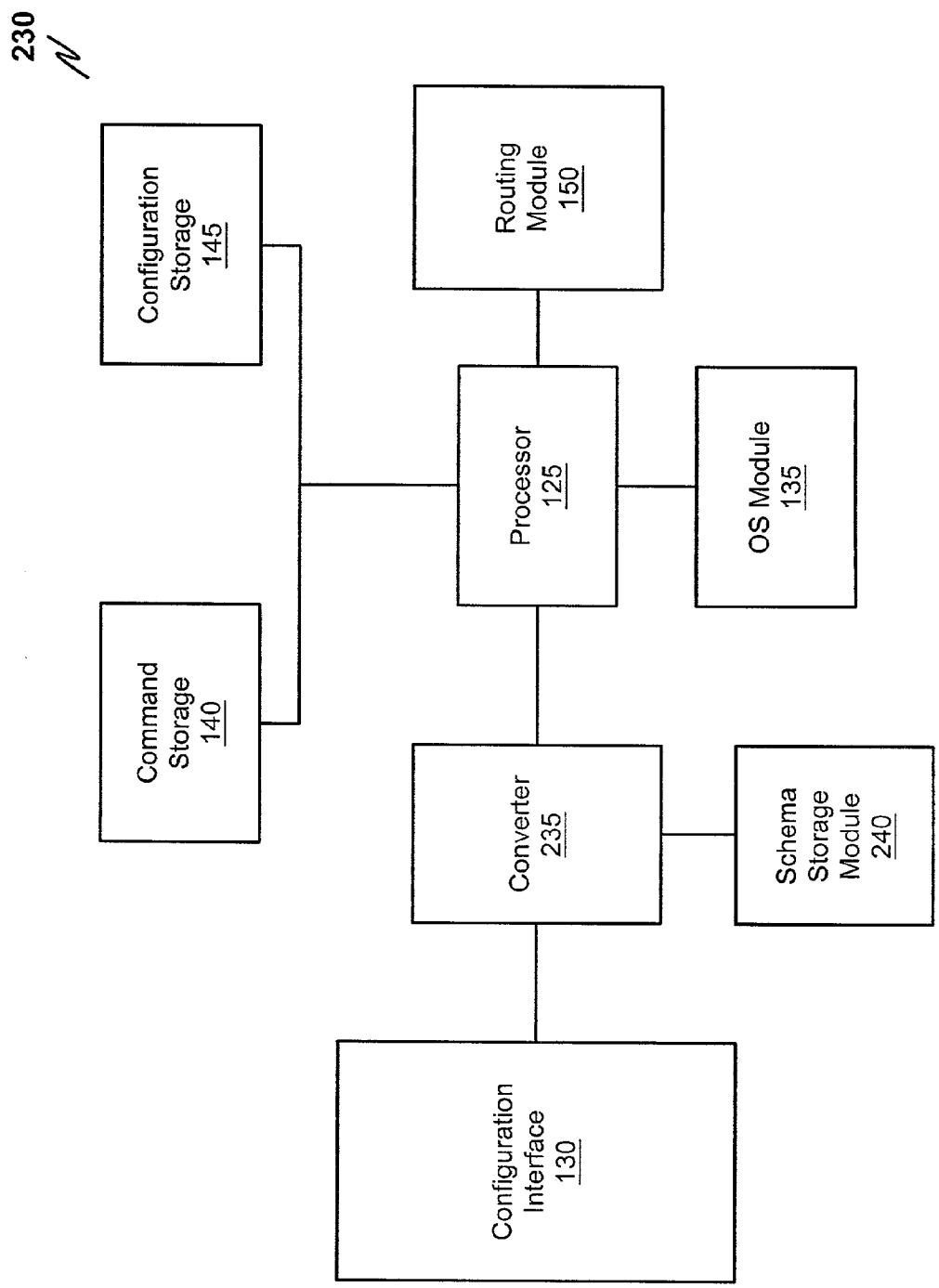
FIG. 5 is a block diagram of a router constructed in accordance with one embodiment of the present invention.

Referring now to FIG. 5, it is a block diagram of a router 230 constructed in accordance with one embodiment of the present invention. In this embodiment, a converter 235 and-schema storage module 240 are added to the router of FIG. 2.

The router 230 is generally configured to interface with the system administrator 125 through the configuration interface. Even though the router 230 operates through a CLI configuration interface, a system administrator 125 can reconfigure such a router using XML-based commands—assuming the configuration schema stored in the schema storage module 240 is an XML schema. For example, a system administrator 125 can send an XML-based command to the configuration interface 130. That XML-based command can be passed to the converter 235 which converts the XML-based command to a CLI-based command using the XML schema. A CLI-based command, not the XML command, can then be passed to the configuration storage module 145 where it is integrated into the configuration of the router.

Figure 6:
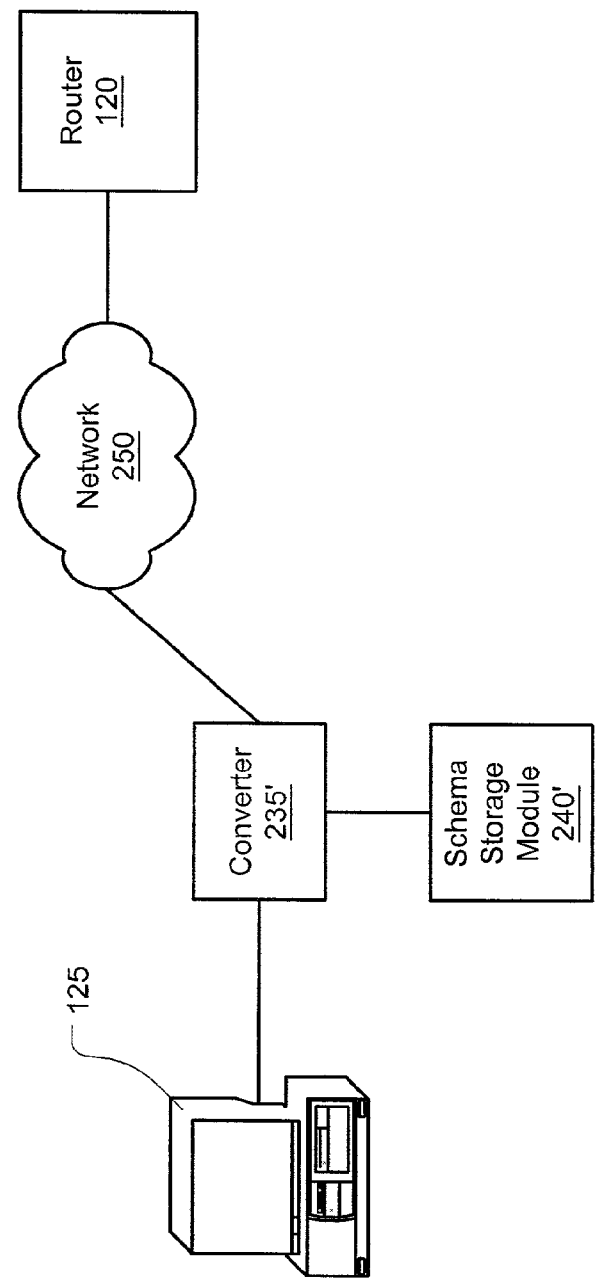
FIG. 6 is a block diagram of one embodiment of the present invention.

Referring now to FIG. 6, it is a block diagram 245 of an embodiment of the present invention in which the converter and schema storage 245 are localized within the system administrator 125. Rather than components within the router 120 converting an XML-based command to a CLI-based command, the localized converter 235' and schema storage module 240' convert the XML-based command to a CLI-based command and then transmit the CLI-based command through the network 250 to the router 120.

Figure 7:
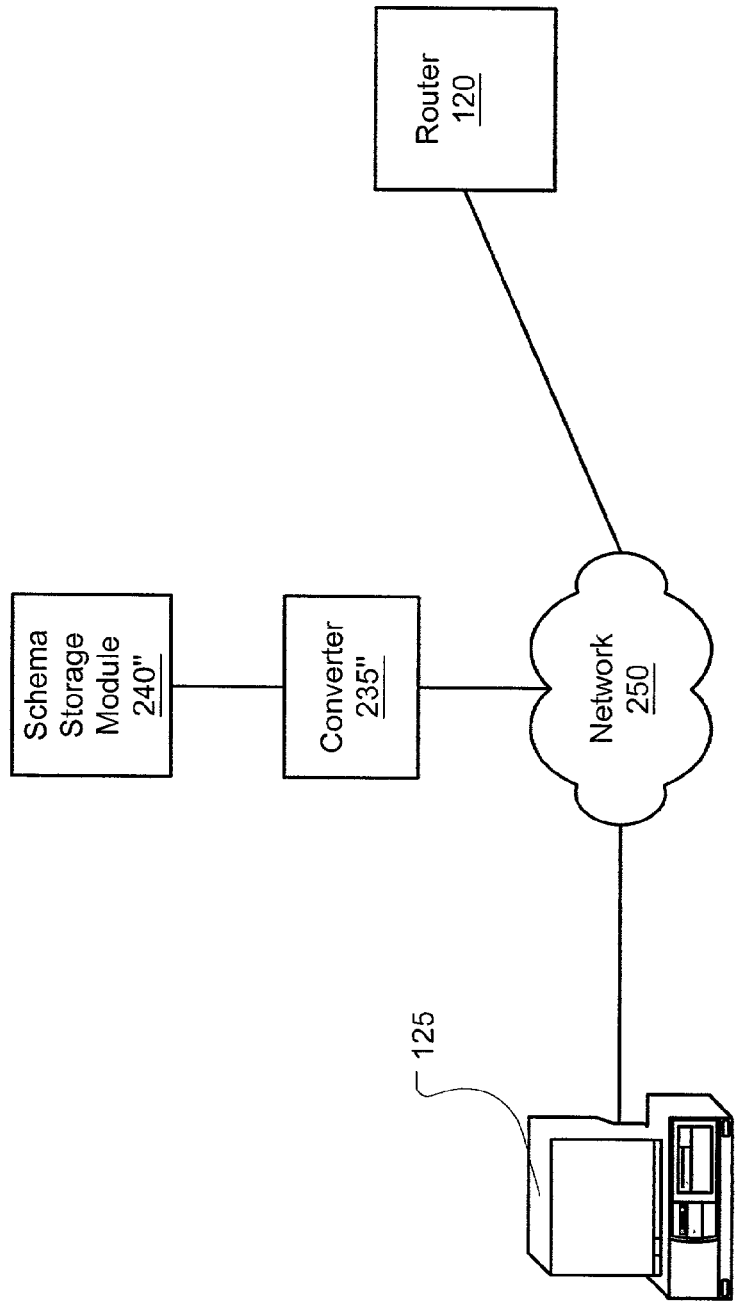
FIG. 7 is a block diagram of another embodiment of the present invention.

Referring now to FIG. 7, it shows a block diagram 255 of yet another embodiment of the present invention. In this embodiment, the converter 235" and schema storage module 240" are distributed relative to both the router 120 and the system administrator 125. Thus, any XML-based configuration commands generated by the system administrator 125 are sent through the network 250 to the converter 235". Using the configuration schema stored in the schema storage module 240", the converter 235" can convert the XML-based command to a CLI-based command and send that command through the network 250 to the router 120.

Figure 8:
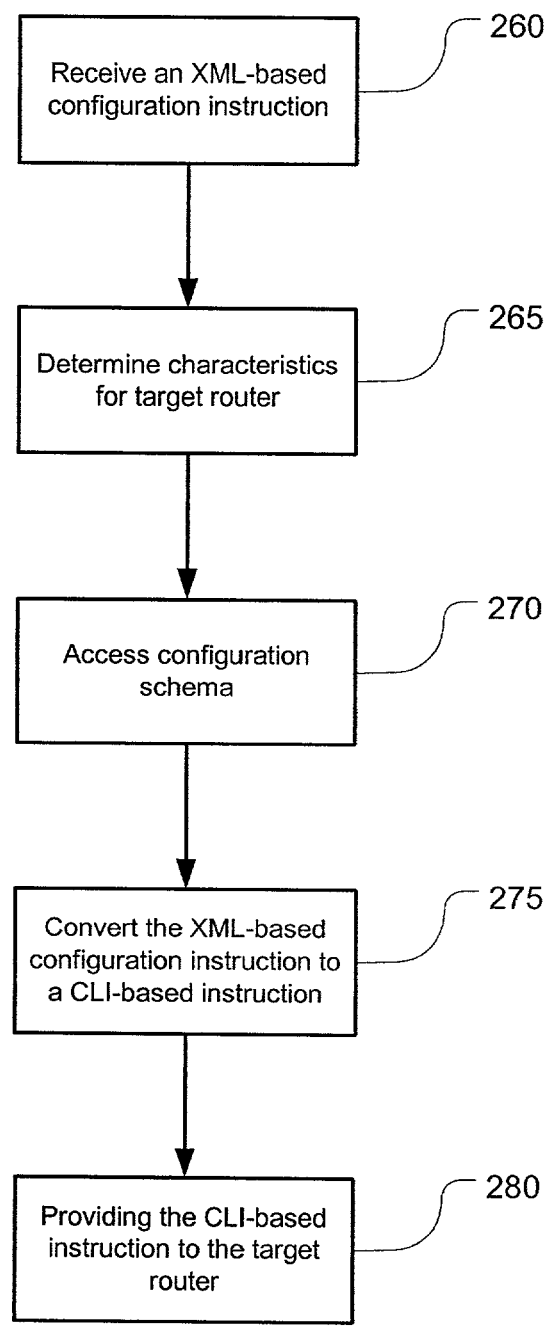
FIG. 8 is a flowchart of one method for configuring a router using a configuration schema.

FIG. 8 illustrates one method of operating the system of FIG. 7. In this method, the converter 235" initially receives an XML-based configuration command (step 260). The converter 235" then determines the manufacturer, model and/or OS version for the router 120 to which the command is directed and accesses the appropriate configuration schema for that router 120. The (steps 265 and 270) converter 235" then generates a CLI-based command from the XML-based command, verifies the correctness and validity of that command, and provides it to the router 120 (steps 275 and 280).

Although the embodiments of the present invention are generally described with regard to a router and in particular with regard to Cisco™ routers, one skilled in the art can understand that the embodiments of the present invention can incorporate routers from most router manufacturers and many other types of network components such as hubs, switches, and optical components. Thus, those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

APPENDIX A

Appendix A
service service $$
service alignment $Control alignment correction and logging$
service alignment detection $Enable detection of alignment issues$
service alignment logging $Enable logging of alignment issues$
service compress-config $Compress the configuration file$
service config $TFTP load config files$
service dhcp $Enable DHCP server and relay agent$
service disable-ip-fast-frag $Disable IP particle-based fast fragmentation$
service exec-callback $Enable exec callback$
service exec-wait $Delay EXEC startup on noisy lines$
service finger $Allow responses to finger requests$
service hide-telnet-addresses $Hide destination addresses in telnet command$
service linenumber $enable line number banner for each exec$
service nagle $Enable Nagle's congestion control algorithm$
service old-slip-prompts $Allow old scripts to operate with slip/ppp$
service pad & $Enable PAD commands$
service pad cmns $Enable PAD over CMNS connections$
service pad from-xot $Accept XOT to PAD connections$
service pad to-xot $Allow outgoing PAD over XOT connections$
service password-encryption $Encrypt system passwords$
service prompt $Enable mode specific prompt$
service prompt config $Enable configuration mode prompt$
service pt-vty-logging $Log significant VTY-Async events$
service sequence-numbers $stamp logger messages with a sequence number$
service single-slot-reload-enable $single Line Card Reload option$
service slave-log $Enable log capability of slave IPs$
service tcp-keepalives-in $Generate keepalives on idle incoming network connections$
service tcp-keepalives-out $Generate keepalives on idle outgoing network connections$
service tcp-small-servers & $Enable small TCP servers (e.g., ECHO)$
service tcp-small-servers max-servers $set number of allowable TCP small servers$
service tcp-small-servers max-servers <1-2147483647> $Maximum TCP small servers$@
service tcp-small-servers max-servers no-limit $No limit to number of allowable TCP small servers$
service telnet-zeroidle $Set TCP window 0 when connection is idle$
service timestamps & $Timestamp debug/log messages$
service timestamps debug & $Timestamp debug messages$
service timestamps debug datetime & $Timestamp with date and time$
service timestamps debug datetime localtime & $Use local time zone for timestamps$
service timestamps debug datetime localtime msec & $Include milliseconds in timestamp$
service timestamps debug datetime localtime msec show-timezone $Add time zone information to timestamp$
service timestamps debug datetime localtime show-timezone & $Add time zone information to timestamp$
service timestamps debug datetime localtime show-timezone msec $Include milliseconds in timestamp$
service timestamps debug datetime msec & $Include milliseconds in timestamp$
service timestamps debug datetime msec localtime & $Use local time zone for timestamps$
service timestamps debug datetime msec localtime show-timezone $Add time zone information to timestamp$
service timestamps debug datetime msec show-timezone & $Add time zone information to timestamp$
service timestamps debug datetime msec show-timezone localtime $Use local time zone for timestamps$
service timestamps debug datetime show-timezone & $Add time zone information to timestamp$
service timestamps debug datetime show-timezone localtime & $Use local time zone for timestamps$
service timestamps debug datetime show-timezone localtime msec $Include milliseconds in timestamp$
service timestamps debug datetime show-timezone msec & $Include milliseconds in timestamp$
service timestamps debug datetime show-timezone msec localtime $Use local time zone for timestamps$
service timestamps debug uptime $Timestamp with system uptime$
service timestamps log & $Timestamp log messages$
service timestamps log datetime & $Timestamp with date and time$
service timestamps log datetime localtime & $Use local time zone for timestamps$
service timestamps log datetime localtime msec & $Include milliseconds in timestamp$
service timestamps log datetime localtime msec show-timezone $Add time zone information to timestamp$
service timestamps log datetime localtime show-timezone & $Add time zone information to timestamp$
service timestamps log datetime localtime show-timezone msec $Include milliseconds in timestamp$

APPENDIX A-continued

Appendix A
service service timestamps log datetime msec & $Include milliseconds in timestamp$
service timestamps log datetime msec localtime & $Use local time zone for timestamps$
service timestamps log datetime msec localtime show-timezone $Add time zone information to timestamp$
service timestamps log datetime msec show-timezone & $Add time zone information to timestamp$
service timestamps log datetime msec show-timezone localtime $Use local time zone for timestamps$
service timestamps log datetime show-timezone & $Add time zone information to timestamp$
service timestamps log datetime show-timezone localtime & $Use local time zone for timestamps$
service timestamps log datetime show-timezone localtime msec $Include milliseconds in timestamp$
service timestamps log datetime show-timezone msec & $Include milliseconds in timestamp$
service timestamps log datetime show-timezone msec localtime $Use local time zone for timestamps$
service timestamps log uptime $Timestamp with system uptime$
service udp-small-servers & $Enable small UDP servers (e.g., ECHO)$
service udp-small-servers max-servers $Set number of allowable UDP small servers$
service udp-small-servers max-servers <1-2147483647> $Maximum UDP small servers$
service udp-small-servers max-servers no-limit $No limit to number of allowable UDP small servers$

APPENDIX B

Appendix B

```
<?xml version="1.0" encoding="UTF-8"?>
<!-- edited with XML Spy v3.5 NT (http://www.xmlspy.com)
by David Heiser (Continuum Networks, Inc.) --
><xsd:schema xmlns:xsd="http://www.w3.org/2000/10/XMLSchema"
elementFormDefault="qualified">
<xsd:element name="configuration">
    <xsd:complexType>
<xsd:choice>
    <xsd:element name="service">
        <xsd:annotation><xsd:documentation></xsd:documentation>
</xsd:annotation>
    <xsd:complexType>
<xsd:choice>
    <xsd:element name="alignment">
        <xsd:annotation><xsd:documentation>Control alignment
correction and logging</xsd:documentation></xsd:annotation>
    <xsd:complexType>
<xsd:choice>
    <xsd:element name="detection">
        <xsd:annotation><xsd:documentation>Enable detection
of alignment issues</xsd:documentation></xsd:annotation>
        <xsd:complexType/>
</xsd:element>
    <xsd:element name="logging">
        <xsd:annotation><xsd:documentation>Enable logging
of alignment issues</xsd:documentation></xsd:annotation>
        <xsd:complexType/>
</xsd:element>
</xsd:choice>
    </xsd:complexType>
</xsd:element>
    <xsd:element name="compress-config">
        <xsd:annotation><xsd:documentation>Compress the
configuration file</xsd:documentation></xsd:annotation>
        <xsd:complexType/>
</xsd:element>
    <xsd:element name="config">
        <xsd:annotation><xsd:documentation>TFTP load config
files</xsd:documentation></xsd:annotation>
        <xsd:complexType/>
</xsd:element>
```

APPENDIX B-continued

Appendix B

```
    <xsd:element name="dhcp">
        <xsd:annotation><xsd:documentation>Enable DHCP
server and relay agent</xsd:documentation></xsd:annotation>
        <xsd:complexType/>
</xsd:element>
    <xsd:element name="disable-ip-fast-frag">
<xsd:annotation><xsd:documentation>Disable IP particle-based
fast fragmentation</xsd:documentation></xsd:annotation>
        <xsd:complexType/>
</xsd:element>
    <xsd:element name="exec-callback">
        <xsd:annotation><xsd:documentation>Enable exec
callback</xsd:documentation></xsd:annotation>
        <xsd:complexType/>
</xsd:element>
    <xsd:element name="exec-wait">
        <xsd:annotation><xsd:documentation>Delay EXEC
startup on noisy lines</xsd:documentation></xsd:annotation>
```

What is claimed is:

1. An electronic method comprising:
  accessing a network component;
  retrieving a command set from the network component the command set including commands that the network component is capable of responding to;
  determining a characteristic of the network component, wherein the determined characteristic is indicative of at least one of: device type, manufacturer, model, and operating system version;
  generating a configuration schema using the retrieved command set, wherein the generated configuration schema corresponds to the network component; and
  storing the generated configuration schema in accordance with the determined characteristic so as to enable the configuration schema to be identified from among a collection of configuration schemas that includes configuration schemas that are associated with other network components.

2. The method of claim 1 further comprising:
activating a command extraction mode of the network component.

3. The method of claim 1, wherein retrieving the command set comprises:
retrieving a set of primary commands;
retrieving a set of subcommands for each of the primary commands in the set of primary commands; and
retrieving a set of bounds for a plurality of the set of subcommands for a first primary command.

4. The method of claim 3, wherein generating the configuration schema comprises:
identifying a command array in the command set, wherein the command array includes a primary command and a subcommand associated with the primary command;
extracting the primary command from the command array; and
extracting the subcommand from the command array.

5. The method of claim 4, wherein generating the configuration schema comprises:
forming an XML object using the extracted primary command and the extracted subcommand.

6. The method of claim 1, wherein the retrieved command set is a first command set and includes a plurality of primary commands and wherein generating the configuration schema comprises:
configuring the network component according to a first of the plurality of primary commands; and
retrieving a second command set;
wherein the second command set includes a plurality of subcommands associated with the first of the plurality of primary commands and wherein the first command set and the second command set are different.

7. The method of claim 1, further comprising:
cleansing the retrieved command set.

8. The method of claim 1, wherein accessing a network component comprises:
accessing a router.

9. A computer program product comprising:
a computer readable storage medium, wherein the computer readable storage medium includes non-signal elements; and
a plurality of instructions stored upon the storage medium, the plurality of instructions configured to instruct an electronic device to:
access a network component;
retrieve a command set from the network component the command set including commands that the network component is capable of responding to;
determine a characteristic of the network component, wherein the determined characteristic is indicative of at least one of: device type, manufacturer, model, and operating system version;
generate a configuration schema corresponding to the network component, wherein the configuration schema is based upon the retrieved command set; and
store the generated configuration schema in accordance with the determined characteristic so as to enable the configuration schema to be identified from among a collection of configuration schemas that includes configuration schemas that are associated with other network components.

10. The computer program product of claim 9, wherein the plurality of instructions are further configured to instruct the electronic device to:
activate a command extraction mode associated with the network component.

11. The computer program product of claim 9, wherein the plurality of instructions are further configured to instruct the electronic device to:
retrieve a bound for a first command in the command set.

* * * * *